(12) United States Patent
Zeuthen

(10) Patent No.: US 6,235,962 B1
(45) Date of Patent: *May 22, 2001

(54) CATALYSTS AND PROCESS FOR RING OPENING OF CYCLIC COMPOUNDS

(75) Inventor: Per Zeuthen, Birkerød (DK)

(73) Assignee: Haldor Topsøe A/S, Lyngby (DK)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,697

(22) Filed: Apr. 27, 1998

Related U.S. Application Data

(60) Provisional application No. 60/045,007, filed on Apr. 28, 1997.

(51) Int. Cl.[7] ............................... C07C 2/00; C07C 5/13

(52) U.S. Cl. ........................ 585/940; 585/700; 585/750

(58) Field of Search .................................. 585/700, 750, 585/940

(56) References Cited

U.S. PATENT DOCUMENTS

| | | | | |
|---|---|---|---|---|
| 4,098,683 | * | 7/1978 | Conway | 208/216 |
| 4,202,758 | * | 5/1980 | O'Hara et al. | 208/143 |
| 4,330,302 | * | 5/1982 | Taylor | 44/63 |
| 5,345,026 | * | 9/1994 | Chang et al. | 585/700 |
| 5,382,730 | | 1/1995 | Breckenridge et al. | 585/310 |
| 5,382,731 | | 1/1995 | Chang et al. | 585/315 |
| 5,463,155 | * | 10/1995 | Galperin et al. | 585/310 |
| 5,498,810 | * | 3/1996 | Bogdan et al. | 585/940 |
| 5,770,042 | * | 6/1998 | Galperin et al. | 585/940 |
| 5,831,139 | * | 11/1998 | Schmidt et al. | 585/940 |

* cited by examiner

*Primary Examiner*—Walter D. Griffin
*Assistant Examiner*—Tam M. Nguyen
(74) *Attorney, Agent, or Firm*—Ostrolenk, Faber, Gerb & Soffen, LLP

(57) ABSTRACT

A catalyst for ring opening of cyclic organic compounds comprising, on a carrier of alumina, silica, zirconia and mixtures thereof, from 0.1 to 10% by weight based on the total weight of the catalyst of a catalytic active metal selected from platinum, palladium, rhodium, rhenium, iridium, ruthenium, nickel, cobalt and mixtures or combinations thereof and from 0.01 to 20% by weight based on the total weight of the catalyst of a metal modifier selected from tungsten, molybdenum lanthanum and rare earth metals and mixtures and combinations thereof.

7 Claims, No Drawings

CATALYSTS AND PROCESS FOR RING OPENING OF CYCLIC COMPOUNDS

This application claims the benefit of U.S. Provisional Application Ser. No. 60/045,007, filed Apr. 28, 1997.

BACKGROUND OF THE INVENTION

1. Field of the Invention

The present invention relates in general to a process and catalyst for ring opening of cyclic compounds. More particularly, the invention concerns metal-supported oxide-based catalysts and a process for ring opening of cyclic compounds including derivatives of cyclopentane, cyclohexane, decaline, indane (indene), benzene, and naphthalene being present in diesel fuel in presence of hydrogen to linear or branched paraffinic molecules.

2. Description of the Related Art

One of the approaches to the improvement of the certain number of diesel fuel is to increase the content of paraffinic compounds with linear chains in the diesel fuel. The content of non-cyclic paraffins in the hydrocarbon mixture can be increased by carrying out ring opening of cycloparaffins formed upon hydrogenation of aromatic compounds present in the fuel.

Commercially available catalytic systems based on 1% Pt/H-Beta zeolite are disclosed in U.S. Pat. No. 5,382,730. The described catalysts exhibit rather high activity in ring opening of $C_6$ cyclic compounds and are used in combination with isomerization catalysts to improve quality of a $C_5$–$C_6$ downstream feed. In this case, however, a 1:3 mixture of normal and isoparaffins was formed at conversion rates of ~80% at 230–270° C. under high-pressure conditions. Another catalyst is proposed in U.S. Pat. No. 5,382,731 for ring opening of $C_6$ cyclic compounds comprising a 1% Pt/$WO_3$/$ZrO_2$ system. The performance of this catalyst is similar to that of Pt/H-Beta zeolite, at slightly different reaction conditions.

Only a very limited number of prior art publications is available, which are related to decalin conversion on zeolite and oxide catalysts. In most of these publications decalin cracking is studied, which leads to more than 100 products in the C1–C10 range. Decalin conversion has also been studied from the viewpoint of its cis-trans isomerization. There is no available reported data on decalin conversion on oxide catalysts.

SUMMARY OF THE INVENTION

The general object of this invention is to provide efficient heterogeneous metal supported catalysts based on various oxide carriers and a process for ring opening of cyclic compounds in the presence of hydrogen by use of the catalysts.

Various types of oxides, hydroxides or mixed oxides and hydroxides can be used as supports for active metal components in ring opening of cyclic organic compounds.

The carriers for the ring opening catalysts are the commercial forms of alumina, silica, zirconia, and mixtures thereof. The oxides are modified with II–VI Group metals, such as tungsten, molybdenum, lanthanum, other rare earth metals, etc.

Catalytically active metals supported on the appropriate carriers are noble and transition metals such as platinum, palladium, rhodium, rhenium, iridium, ruthenium, nickel, cobalt or combinations thereof. The metal loading in the catalyst may range from 0.1 to 10 wt %.

In accordance with the above finding, the present invention provides a catalyst active in ring opening of cyclic organic compounds comprising on a carrier of alumina, silica, zirconia and mixtures thereof, preferably from 0.1 to 10 percent by weight of a catalytic active metal selected from platinum, palladium, rhodium, rhenium, iridium, ruthenium, nickel, cobalt and mixtures or combinations thereof and from 0.01 to 20 percent by weight of a metal modifier selected from tungsten, molybdenum and rare earth metals (Sc,4, and La to Lu inclusive).

The invention furthermore provides a process for the ring opening of cyclic organic compounds by contacting the compounds in presence of hydrogen with a catalyst comprising a carrier of alumina, silica, zirconia and mixtures thereof from 0.1 to 10 percent by weight of a catalytic active metal selected from platinum, palladium, rhodium, rhenium, iridium, ruthenium, nickel, cobalt and mixtures or combinations thereof and from 0.01 to 20 percent by weight of a metal modifier selected from tungsten, molybdenum, lanthanum and rare earth metals.

When operating the process of the invention, hydrogen or a mixture of hydrogen with an inert gas is used as a reducing agent.

Hydrocarbons or mixtures thereof are introduced in a flow-type high-pressure reactor as a mixture with hydrogen or with a mixture of hydrogen and an inert gas.

Convenient process conditions are a hydrogen-to-hydrocarbon ratio ranging from 1:1 to 1:50, more preferably from 1:5 to 1:20; a liquid hourly space velocity ranging from 0.1 to 10, more preferably, from 0.5 to 2; and a total pressure from 1 to 100 atm, more preferably from 20 to 50 atm. The reaction is preferably carried out at a temperature from 450 to 670° K.

The products evolving from the process comprise typically a mixture of gas products and liquid products, including paraffinic linear or branched hydrocarbons, cyclic compounds (both naphthenes and aromatics).

In order to further illustrate the present invention and the advantages thereof, the following specific examples are given below.

In the Examples, the following parameters (in percent) are used: C=percentage of conversion, S=selectivity, Y=yield based on the product passed=C×S.

DETAILED DESCRIPTION OF THE PREFERRED EMBODIMENTS

Other details, features and advantages of the present invention will become apparent from the following description of the invention and further description of the preferred embodiments.

EXAMPLE 1

A γ-alumina carrier with a specific surface area of 170 $m^2$/g is impregnated to incipient wetness with a solution of [Rh(NH_3)_5Cl]Cl_2 so that the metal loading will be 0.5, 1.0, or 2.0 wt %. The samples obtained were dried and then reduced in a hydrogen flow at 450° C. for 1 h. The thus prepared catalysts were tested in cyclohexane transformations in a flow reactor at the following conditions:

Reaction temperature=260–320° C.,

VHSV=2 $h^{-1}$

Total pressure–1–5 Mpa,

Hydrogen-to-cyclohexane ratio (molar)=10:1.

3 ml of a catalyst in powder form (particle size of 0.2–0.5 mm) were placed into a tubular reactor made of quartz or stainless steel (with an internal diameter of 14 mm).

The results are summarized in Table 1. The C, S and Y parameters were measured 30 min after the beginning of the reaction.

EXAMPLE 2

Bimetallic catalysts containing Rh+Pt in different molar ratios, Rh+Re, and Rh+Ru were prepared on the basis of the same alumina carrier, which was impregnated with a solution containing the complexes, salts or other compounds of the above metals, such as $[Rh(NH_3)_5Cl]Cl_2$, $RhCl_3$, $H_2PtCl_6$, $(NH_4)_2ReO_4$, with appropriate concentrations of the components so that the overall metal loading was 1.0 or 1.5 wt %. The catalysts thus obtained were tested in cyclohexane conversion under conditions of Example 1. The results are summarized in Table 1.

EXAMPLE 3

The same γ-alumina carrier was impregnated with platinum so that the metal loading was 1 wt %. The catalyst testing was carried out under the same conditions as described in Example 1. The results of testing in ring opening of cyclohexane are presented in Table 2.

EXAMPLE 4

Similarly the catalyst 1% Ru/γ-alumina was prepared on the basis of the same support. The results of this catalyst testing in cyclohexane transformations under conditions of Example 1 are given in Table 2.

EXAMPLE 5

A $SiO_2$ carrier with a specific surface area of 450 $m_2/g$ was impregnated to incipient wetness with $[Rh(NH_3)_5Cl]Cl_2$, so that the metal loading was 1 wt %. The data on cyclohexane conversion and ring opening selectivity for this catalyst are collected in Table 1.

EXAMPLE 6

$ZrO_2$ (surface area ~150 $m_2/g$) was modified with 3 wt % $La_2O_3$ supported by impregnation with lanthanum nitrate, followed by calcination at 500° C. Then 1 wt % of rhodium was supported by incipient wetness impregnation. After reduction, the catalyst was tested in cyclohexane ring opening. The results are presented in Table 1.

EXAMPLE 7

$ZrO_2$ modified with 3 wt % $La_2O_3$ by impregnation with lanthanum nitrate was further impregnated with platinum using $[Pt(NH_3)_6](HCO_3)_2$. The metal loading was 1 wt %. The data on this catalyst performance in cyclohexane ring opening under conditions of Example 1 are shown in Table 2.

EXAMPLE 8

The γ-alumina carrier was modified with 1 wt % of iridium. The catalytic data on cyclohexane conversion obtained after reduction in hydrogen are given in Table 2.

EXAMPLE 9

The 1% Rh/γ-alumina catalyst prepared as described in Example 1 was reduced in different ways: at different temperatures in a hydrogen flow with or without the preliminary oxidative treatment in an oxygen flow. The comparative data on cyclohexane ring opening on the thus prepared and reduced catalysts are presented in Table 3.

EXAMPLE 10

The catalysts prepared according to Examples 1 and 2 were tested in the reaction of trans 1, 2-dimethylcyclohexane conversion under conditions of Example 1. The results are given in Table 4.

EXAMPLE 11

The catalysts prepared according to Examples 1 and 2 were tested in the reaction of trans -1, 4-dimethylcyclohexane conversion under conditions of Example 1. The catalytic data are collected in Table 5.

EXAMPLE 12

The catalysts prepared according to Examples 1 and 2 were tested in the reaction of ethylocyclohexane transformations under conditions of Example 1. The results are presented in Table 6.

TABLE 1

Effect of pressure on the catalytic properties of metal-containing (metals of group VIII) oxide catalysts in the cyclohexane transformation ($H_2$: CH = 10:1 (vol.), VHSV = 2 $h^{-1}$, catalyst loading 3 cc)

| Catalyst | P, MPa | T, ° C. | Conversion, % | Selectivity, % | | Yield, wt. % | | | | | |
|---|---|---|---|---|---|---|---|---|---|---|---|
| | | | | Σ | n-$C_6$ | $C_1$-$C_4$ | $C_5$—$H_{12}$ | i-$C_6H_{14}$ | n-$C_6H_{14}$ | MCP | $C_6H_6$ |
| 1 | 2 | 3 | 4 | 5 | 6 | 7 | 8 | 9 | 10 | 11 | 12 |
| 0.5Rh/$Al_2O_3$ (Ex. 1) | 1 | 320 | 45.1 | 63 | 59 | 7.8 | 7.5 | 1.9 | 26.4 | 1.5 | — |
| 1Rh/$Al_2O_3$ (egg-shell) (Ex. 1) | 1 | 300 | 34.0 | 71 | 70 | 3.7 | 6.0 | 0.6 | 23.7 | — | — |
| | | 320 | 55.4 | 57 | 54 | 11.3 | 12.5 | 1.4 | 30.2 | — | — |
| 1Rh/$Al_2O_3$ (Ex. 1) | 3 | 300 | 87.4 | 69 | 69 | 17.0 | 10.1 | — | 60.3 | — | — |
| | 4 | 320 | 81.6 | 52 | 52 | 15.0 | 24.2 | — | 42.4 | — | — |
| 1Rh/$SiO_2$ (Ex. 5) | 5 | 300 | 33.7 | 82 | 82 | 1.7 | 4.2 | — | 27.8 | — | — |
| | | 320 | 92.7 | 56 | 56 | 18.6 | 22.2 | — | 51.9 | — | — |
| | 1 | 280 | 33.8 | 63 | 63 | 6.4 | 6.1 | — | 21.3 | — | — |
| 1Rh/3La—$ZrO_2$ (Ex. 6) | | 300 | 60.6 | 45 | 44 | 20.0 | 13.6 | 0.6 | 26.4 | — | — |
| | 2 | 280 | 41.7 | 72 | 72 | 6.0 | 5.7 | — | 30.0 | — | — |
| | 3 | 280 | 47.9 | 71 | 71 | 7.7 | 6.1 | — | 34.1 | — | — |

TABLE 1-continued

Effect of pressure on the catalytic properties of metal-containing (metals of group VIII) oxide catalysts in the cyclohexane transformation ($H_2$: CH = 10:1 (vol.), VHSV = 2 $h^{-1}$, catalyst loading 3 cc)

| Catalyst 1 | T, °C. 2 | P, MPa 3 | Conversion, % 4 | Selectivity, % n-$C_6$ 5 | Yield, wt % $C_1$–$C_4$ 6 | $C_5H_{12}$ 7 | i-$C_6H_{14}$ 8 | n-$C_6H_{14}$ 9 | MCP 10 | $C_6H_6$ 11 |
|---|---|---|---|---|---|---|---|---|---|---|
| 2Rh/$Al_2O_3$ | 260 | 3 | 35.7 | 94 | 0.6 | 1.6 | 0.1 | 33.4 | — | — |
| (Ex. 1) | 280 | 5 | 83.0 | 85 | 6.9 | 5.3 | 0.3 | 70.5 | — | — |
| 1Rh/$Al_2O_3$ | 280 | 5 | 55.9 | 88 | 4.9 | 2.0 | — | 49.0 | — | — |
| (Ex. 1) | 300 | 3 | 91.0 | 65 | 21.2 | 9.9 | 0.6 | 59.3 | — | — |
| 1Rh-0.5Pt/$Al_2O_3$ | 260 | 3 | 20.9 | 91 | 0.1 | 1.7 | — | 19.1 | — | — |
| (Ex. 2) | 280 | 3 | 64.8 | 83 | 1.1 | 9.7 | 0.1 | 53.9 | — | — |
|  |  | 4 | 56.3 | 88 | 0.7 | 5.8 | 0.1 | 49.7 | — |  |
| 075Rh—0.25Pt/ | 300 | 5 | 32.4 | 88 | 2.6 | 1.3 | — | 28.5 | — | — |
| $Al_2O_3$ | 320 | 4 | 72.2 | 69 | 15.2 | 6.2 | 1.2 | 49.6 | — | — |
| (Ex. 2) |  |  |  |  |  |  |  |  |  |  |
| 0.5Rh—0.5Pt/$Al_2O_3$ | 320 | 4 | 61.8 | 80 | 7.0 | 4.5 | 0.8 | 49.5 | — | — |
| (Ex. 2) |  | 5 | 65.0 | 82 | 7.0 | 4.1 | 0.7 | 53.2 | — | — |
| 0.25Rh—0.75Pt/ | 300 | 3 | 44.0 | 79 | 2.5 | 6.6 | — | 34.9 | — | — |
| $Al_2O_3$ | 320 | 2 | 69.5 | 58 | 10.3 | 18.1 | 1.0 | 40.1 | — | — |
| (Ex. 2) |  | 3 | 90.8 | 59 | 16.0 | 20.6 | 0.8 | 53.4 | — | — |
| 0.5Rh—0.5Re/$Al_2O_3$ | 260 | 1 | 42.1 | 37 | 18.2 | 8.0 | 0.4 | 15.5 | — | — |
| (Ex. 2) |  |  |  |  |  |  |  |  |  |  |
| 0.5Rh—0.25Pt—0.25Ir/ | 260 | 1 | 18.4 | 75 | 0.9 | 3.7 | — | 13.8 | — | — |
| $Al_2O_3$ | 280 | 1 | 43.9 | 56 | 5.2 | 13.9 | — | 24.8 | — | — |
| (Ex. 2) |  | 2 | 44.8 | 75 | 2.1 | 8.5 | 0.7 | 33.5 | — | — |
|  |  | 3 | 43.6 | 81 | 1.9 | 6.2 | — | 35.5 | — | — |

TABLE 2

Effect of pressure on the catalytic properties of metal-containing (metals of group VIII) oxide catalysts in the cyclohexane transformation ($H_2$: CH = 10:1 (vol.), VHSV = 2 $h^{-1}$, catalyst loading 3 cc)

| Catalyst 1 | P, MPa 2 | T, °C. 3 | Conversion, % 4 | Selectivity, % Σ 5 | n-$C_6$ 6 | Yield, wt % $C_1$–$C_4$ 7 | $C_5$—$H_{12}$ 8 | i-$C_6H_{14}$ 9 | n-$C_6H_{14}$ 10 | MCP 11 | $C_6H_6$ 12 |
|---|---|---|---|---|---|---|---|---|---|---|---|
| 1Pt/$Al_2O_3$ | 3 | 400 | 41.4 | 50 | 42 | 0.3 | 0.9 | 3.3 | 17.5 | 3.7 | 15.7 |
| (Ex. 3) |  |  |  |  |  |  |  |  |  |  |  |
|  | 2 | 370 | 18.7 | 96 | 96 | 0.7 | — | — | 18.0 | — | — |
| 1Pt/3La—$ZrO_2$ | 3 | 400 | 83.3 | 63 | 52 | 16.2 | 10.0 | 8.9 | 43.4 | — | 4.8 |
| (Ex. 7) | 4 | 380 | 57.5 | 80 | 67 | 6.8 | 4.6 | 7.6 | 38.5 | — | — |
| 1Ru/$Al_2O_3$ | 1 | 210 | 29.4 | 54 | 53 | 4.6 | 8.8 | 0.3 | 15.7 | — | — |
| (Ex. 4) |  |  |  |  |  |  |  |  |  |  |  |
| 1Ir/$Al_2O_3$ | 1 | 341 | 33.7 | 74.6 | 74.1 | 5.1 | 28.6 | 0.6 | 24.9 | 0.1 | 0.2 |
| (Ex. 8) |  |  |  |  |  |  |  |  |  |  |  |

TABLE 3

Effect of the catalyst preliminary treatment in the cyclohexane hydrogenolysis (catalyst 1% Rh/$Al_2O_3$ (Mag-42A), loading 3 cc, $H_2$: CH = 10:1 (vol.), VHSV = 2 $h^{-1}$,)

| Preliminary treatment condition (Ex. 9) 1 | T, °C. 2 | P, MPa 3 | Conversion, % 4 | Selectivity, % n-$C_6$ 5 | Yield, wt. % $C_1$–$C_4$ 6 | $C_5H_{12}$ 7 | i-$C_6H_{14}$ 8 | n-$C_6H_{14}$ 9 | MCP 10 |
|---|---|---|---|---|---|---|---|---|---|
| $H_2$ (450° C., 3 h) | 280 | 3 | 71.0 | 82 | 8.3 | 4.3 | — | 58.4 | — |
| $H_2$ (520° C., 3 h) | 280 | 3 | 47.2 | 87 | 3.4 | 2.6 | — | 41.2 | — |
| $H_2$ (600° C., 3 h) | 280 | 3 | 36.4 | 91 | 1.4 | 1.9 | — | 33.1 | — |
| Air (500° C., 3 h), | 280 | 3 | 35.0 | 84 | 2.9 | 2.1 | 0.7 | 29.3 | — |
| Air (500° C., 3 h), $H_2$ (450° C., 3 h) | 280 | 3 | 22.6 | 91 | 0.9 | 1.1 | — | 20.6 | — |

TABLE 4

The ring opening of trans-1,2-dimethylcyclohexane (98.8%) on metal-containing oxides catalysts
($H_2$: CH = 10:1 (vol.), VHSV = 2 $h^{-1}$, catalyst loading 3 cc)

| | | | | Yield, wt. % | | | | | | | |
| | | | | | | | | | i-$C_8H_{18}$ | | |
| Catalyst (Ex. 10) 1 | P, MPa 2 | T, °C. 3 | Conversion[1], % 4 | $C_1$–$C_4$ 5 | $C_5$–$C_6$ 6 | i-$C_7$ 7 | n-$C_7$ 8 | 2,3-dimethyl hexane 9 | 3,4-dimethyl hexane 10 | 3-methyl-heptane + 3-ethyl-hexane 11 | other i-$C_8$ 12 |
|---|---|---|---|---|---|---|---|---|---|---|---|
| 1Rh/$Al_2O_3$[2] | 4 | 320 | 15.7 | 4.2 | 0.2 | 1.4 | — | 4.3 | 3.5 | 0.2 | 0.8 |
| | | 350 | 26.2 | 8.2 | 0.5 | 3.3 | — | 5.7 | 4.5 | 0.4 | 1.6 |
| 2Rh/$Al_2O_3$[2] | 4 | 320 | 20.2 | 1.6 | 0.2 | 2.7 | — | 6.7 | 5.5 | 0.4 | 1.6 |
| | | 350 | 40.6 | 2.7 | 1.0 | 8.1 | 0.1 | 10.4 | 8.1 | 1.0 | 5.1 |
| | | 370 | 64.1 | 5.9 | 2.5 | 13.9 | 0.3 | 11.9 | 8.9 | 1.7 | 9.9 |
| 0.75Rh—0.25Pt/ $Al_2O_3$[2] | 4 | 350 | 21.2 | 0.8 | 0.2 | 1.6 | 0.1 | 3.4 | 2.6 | 1.6 | 2.8 |
| | | 370 | 35.2 | 1.0 | 0.7 | 3.3 | 0.3 | 4.9 | 3.5 | 2.5 | 5.3 |

| | | Yield, wt. % | | | | | |
| Catalyst (Ex. 10) 1 | n-$C_8$ 13 | Cyclohexane 14 | Me-cyclohexane 15 | Benzene + Toluene 16 | cis-1,2-DMCH 17 | o-Xylene 18 | other products 19 |
|---|---|---|---|---|---|---|---|
| 1Rh/$Al_2O_3$[2] | — | 0.1 | 0.8 | — | 19.1 | 0.2 | — |
| | — | 0.1 | 1.4 | — | 17.3 | 0.5 | — |
| 2Rh/$Al_2O_3$[2] | 0.1 | — | 1.2 | — | 18.2 | 0.1 | 0.1 |
| | 0.3 | — | 2.6 | — | 14.0 | 0.8 | 0.4 |
| | 0.6 | 0.1 | 4.0 | 0.4 | 8.8 | 2.4 | 1.6 |
| 0.75Rh—0.25Pt/ $Al_2O_3$[2] | 0.2 | 0.1 | 4.9 | — | 18.8 | 2.5 | 0.5 |
| | 0.4 | 0.2 | 7.4 | 0.2 | 15.7 | 4.6 | 0.9 |

[1]conversion is calculated without cis-1,2-dimethylcyclohexane yield.
[2]$Al_2O_3$ - Mag42A, 1/20" TL B198-1.

TABLE 5

The ring opening of trans-1,4-dimethylcyclohexane (98.4%) on metal-containing oxides catalysts
($H_2$: CH = 10:1 (vol.), VHSV = 2 $h^{-1}$, catalyst loading 3 cc)

| | | | | Yield, wt. % | | | | | | | | | | | | |
| | | | | | | | | i-$C_8H_{18}$ | | | | | | | | |
| Catalyst (Ex. 11) 1 | P, MPa 2 | T, °C. 3 | Conversion[1], % 4 | $C_1$–$C_4$ 5 | $C_5$–$C_6$ 6 | i-$C_7$ 7 | n-$C_7$ 8 | 2,5-dimethyl hexane 9 | other i-$C_8$ 10 | n-$C_8$ 11 | Cyclohexane 12 | Me-cyclohexane 13 | Methyl-Benzene + Toluene 14 | cis-1,4-DMCH 15 | p-Xylene 16 | other products 17 |
|---|---|---|---|---|---|---|---|---|---|---|---|---|---|---|---|---|
| 2Rh/$Al_2O_3$[2] | 4 | 350 | 27.2 | 4.1 | 0.9 | 1.8 | — | 3.8 | 1.0 | — | 0.1 | 5.3 | 0.4 | 20.3 | 9.5 | 0.3 |
| | | 370 | 34.9 | 5.8 | 2.3 | 4.0 | 0.1– | 5.4 | 1.5 | — | 0.2 | 7.5– | 0.4 | 19.0 | 7.2– | 0.5 |
| 0.75Rh—0.25Pt/ $Al_2O_3$[2] | 4 | 350 | 20.1 | 4.7 | 0.4 | 1.0 | 0.1 | 3.7 | 1.2 | — | 0.1 | 7.0 | — | 22.3 | 1.7 | 0.2 |
| | | 370 | 35.8 | 5.4 | 0.8 | 2.8 | 0.2 | 5.5 | 2.8 | — | 0.3 | 11.7 | 0.5 | 18.6 | 5.4 | 0.4 |

[1]Conversion is calculated without cis-1,4-dimethylcyclohexane yield.
[2]$Al_2O_3$ - Mag42A, 1/20" TL B198-1.

TABLE 6

The ring opening of ethylcyclohexane (98.0%) on metal-containing oxides catalysts
($H_2$: CH = 10:1 (vol.), VHSV = 2 $h^{-1}$, catalyst loading 3 cc)

| | | | | | | | | Yield, wt. % | | | | | | |
|---|---|---|---|---|---|---|---|---|---|---|---|---|---|---|
| | | | | | | | | | i-$C_8H_{18}$ | | | | | |
| Catalyst (Ex. 11) 1 | P, MPa 2 | T, °C. 3 | Conversion[1], % 4 | $C_1$–$C_4$ 5 | $C_5$–$C_6$ 6 | i-$C_7$ 7 | n-$C_7$ 8 | 3-methyl-heptane + 3-ethyl-hexane 9 | other i-$C_8$ 10 | n-$C_8$ 11 | Cyclohexane 12 | Methylcyclohexane 13 | Benzene + Toluene 14 | other products 15 |
| 2Rh/$Al_2O_3$[1] | 4 | 280 | 46.1 | 8.9 | 0.3 | 2.5 | — | 11.9 | 0.3 | — | 0.2 | 22.0 | — | — |
| | | 300 | 58.9 | 12.4 | 0.9 | 5.5 | 0.1 | 11.7 | 0.3 | — | 0.2 | 27.7 | — | 0.1 |
| | | 320 | 93.7 | 16.5 | 5.8 | 23.0 | 0.3 | 11.7 | 0.6 | 0.1 | 0.3 | 35.1 | — | 0.3 |
| 0.75Rh—0.25 Pt/$Al_2O_3$[1] | 4 | 300 | 31.6 | 7.7 | 0.2 | 1.1 | — | 8.2 | 0.6 | — | 0.4 | 13.3 | 0.1 | — |
| | | 320 | 47.2 | 7.9 | 0.5 | 2.6 | 0.1 | 9.9 | 1.2 | — | 0.5 | 24.3 | 0.1 | 0.1 |
| | | 350 | 82.7 | 16.4 | 4.3 | 14.6 | 1.0 | 9.1 | 1.3 | 0.6 | 1.8 | 3.25 | 0.4 | 0.7 |

[1]$Al_2O_3$ - Mag42A, 1/20" TL B198-1.

For Pt containing $Al_2O_3$-based catalysts, the formation of aromatic hydrocarbons substantially decreases at high pressures, but still high reaction temperatures are required to provide a reasonable conversion (350–400° C.).

The highest n-$C_6H_{14}$ yield (17.5%) was achieved at 400° C., 3 MPa. The ring-opening selectivity is 50% and n-paraffin is the main product at a selectivity of 42%. Bracking is not as decisive as an atmospheric pressure and the cumulative yield of $C_1$–$C_4$ hydrocarbons does not exceed 0.3 wt %. Nevertheless, dehydrogenation (the benzene yield is 15.7%) still contributes substantially to the reaction network. Isomerization processes, on the contrary, are suppressed and the overall yield of iso-$C_6$ and MCP is close to 7%.

Rhodium-containing catalyst systems were shown to be most active and selective in ring opening of cyclic hydrocarbons. The reaction proceeds at substantially lower temperatures compared to Pt-catalysts and dehydrogenation is suppressed to a considerable extent. Thus, at 260° C. and 3 MPa, the 2% Rh/$Al_2O_3$ catalyst provides a yield of n-hexane from cyclohexane of 33.4% at a selectivity of 94%. No isomerization (iso-$C_6H_{14}$, MCP) or dehydrogenation ($C_6H_6$) products were identified under these conditions. The highest n-$C_6$ yield (70.5%) was achieved on this catalyst at 280° C. at the ring opening selectivity of 85%.

The Rh/$Al_2O_3$ catalyst containing 0.5 wt % Rh shows about the same performance as the 1% Rh/$Al_2O_3$ sample, which is somewhat lower as compared to the sample containing 2 wt % Rh; therefore, in principle, the metal loading can be decreased. Thus, the highest yield of n-hexane for the 0.5% Rh/$Al_2O_3$ catalyst reaches 26.4% at the selectivity close to 60% at 320° C., 1 MPa.

The egg-shell 1% Rh/$Al_2O_3$ catalyst shows similar catalytic properties, and the n-hexane yield is about 30% at 320° C. at the selectivity of 54%.

The 1% Rh/$Al_2O_3$ catalyst tested at the pressure of 3 Mpa provides the yield of n-hexane close to 60% at 300° C. at the ring-opening selectivity of 69%.

The 1% Rh/$SiO_2$ catalyst is less active in cyclohexane conversion, as compared with $Al_2O_3$-based systems and the selectivities are lower. At high pressures (5 MPa), the n-hexane yield reaches ~52% at 320° C. The selectivity is 56%.

Ru-containing catalysts show advantageous catalytic properties in ring opening of cyclohexane. The cyclohexane conversion on the 1 Ru/$Al_2O_3$ catalysts is high (up to 30%) even at low temperatures of 200–210° C., i.e., at temperatures when both Pt and Rh catalysts are inactive. However, at temperatures above 230° C, the Ru-containing catalysts catalyze solely cracking, i.e., the temperature intervals favorable for ring opening on Ru-catalysts are very narrow (200–220° C.).

Modification of $ZrO_2$ with $La_2O_3$ (3 wt %) completely suppresses the isomerization side reactions in the case of the 1% Rh/3% $La_3O_3$/$ZrO_2$ catalyst. However, light products ($C_1$–$C_4$) are still formed in a considerable amount, probably, not by a cracking mechanism but via hydrogenolysis of cyclohexane and products of ring opening. Nevertheless, the yield of n-hexane is rather high (up to 34% at 280° C., 3 MPa) at a ring-opening selectivity of 71%.

In the case of the 1% Pt/3% $La_3O_3$/$ZrO_2$ catalyst, the pattern with the formation of ring opening products is very similar to that found for 1% Rh/3% $La_2O_3$/$ZrO_3$ and the maximum yield of n-hexane (43.4%) was achieved at 400° C., 3 MPa, the selectivity to n-hexane was 52%. Unlike the Rh-containing catalyst, for the Pt-sample, isomerization products (isohexanes) were also formed, which can be explained by the peculiarities of the procedure used for supporting platinum: $H_2PtCl_6$ was used as a source of Pt and this acid introduced some acidity in the support. Also, dehydrogenation processes occur in the case of the Pt catalyst, which can be substantially suppressed by increasing the reaction pressure to 3 MPa. Reasonably high selectivity of 96% was achieved on this catalyst at 370° C. and 2 MPa, the n-hexane yield was equal to 18%. It is interesting to note that for the 1% Pt/3% $La_2O_3$/$ZrO_2$ sample, the effect of switching from the complex pattern to pure cracking is observed when the reaction temperature increases from 400 to 420° C. at Interesting results were obtained with 1% IR/$Al_2O_3$ (Table 2): the maximum yield of n-hexane was 24.9% at 341° C., 1.0 MPa and dilution of 10:1; the ring-opening selectivity was 74.1%. Only small amounts of cracking products were found at the reactor outlet.

To summarize, the given Examples show that the catalysts according to the invention for the process of ring opening of cyclic compounds in the presence of hydrogen exhibit the following advantages over the known catalysts disclosed in U.S. Pat. Nos. 5,382,730 and 5,382,731:

(i) The yield of ring opening products on the inventive catalysts may be increased to 50–70% at the selectivity of 70–95%;

(ii) Mainly normal paraffins are formed in cyclohexane ring opening, whereas the reactions of skeletal isomerization and cracking, as well as dehydrogenation are substantially suppressed;

(iii) Bimetallic Rh-Pt and Rh-Ru catalysts show a good performance at a lower overall metal loading as compared to monometallic catalysts and the range of the reaction temperatures and pressures that are optimal for the ring opening process is wider.

While the invention has been described in terms of various preferred embodiments, the skilled artisan will appreciate that various modifications, substitutions, omissions and other changes may be made without departing from the spirit thereof. Accordingly, it is intended that the scope of the present invention be limited solely by the following claims, including equivalents thereof.

I claim:

1. A process for ring opening of paraffinic cyclic organic compounds by contacting the compounds in the presence of hydrogen with a catalyst comprising:
   (a) a carrier consisting of alumina;
   (b) a metal modifier selected from the group consisting of scandium, yttrium and lanthanum; and
   (c) at least one catalytically active metal selected from the group consisting of platinum, palladium, rhodium, rhenium, iridium, ruthenium, nickel and cobalt supported on the alumina carrier.

2. The process of claim 1 wherein the amount of metal modifier is from 0.01 to 20% by weight and the amount of catalytically active metals is from 0.1% to 10% by weight.

3. The process of claim 2, wherein the amount of catalytically active metal in between 0.5 and 2% by weight.

4. The process of claim 1, wherein ring opening of cyclic compounds is carried out in diesel fuel containing cyclic organic compounds.

5. The process of claim 1, where said cyclic organic compound is cyclohexane.

6. A process according to claim 1, wherein the catalytically active metal is used in combination with at least one metal selected from the group consisting of platinum and iridium.

7. A process for ring opening of paraffinic cyclic organic compounds by contacting the compounds in the presence of hydrogen with a catalyst comprising:
   (a) a carrier consisting of alumina;
   (b) a metal modifier selected from the group consisting of tungsten and molybdenum; and
   (c) at least one catalytically active metal selected from the group consisting of platinum, palladium, rhodium, rhenium, iridium, ruthenium, nickel and cobalt supported on the alumina carrier.

* * * * *